US010781304B2

(12) United States Patent
Wang et al.

(10) Patent No.: US 10,781,304 B2
(45) Date of Patent: Sep. 22, 2020

(54) POLYPROPYLENE COMPOSITIONS WITH LOW FOGGING (71) Applicant: BOREALIS AG, Vienna (AT)

(72) Inventors: Jingbo Wang, Engerwitzdorf (AT); Claudia Kniesel, Linz (AT); Minna Aarnio-Winterhof, Altenberg (AT); Karlheinz Friedrich, Weiden am See (AT); Friedrich Berger, Linz (AT)

(73) Assignee: BOREALIS AG (AT)

(*) Notice: Subject to any disclaimer, the term of this patent is extended or adjusted under 35 U.S.C. 154(b) by 40 days.

(21) Appl. No.: 16/308,199

(22) PCT Filed: Jun. 20, 2017

(86) PCT No.: PCT/EP2017/065053
§ 371 (c)(1),
(2) Date: Dec. 7, 2018

(87) PCT Pub. No.: WO2017/220556
PCT Pub. Date: Dec. 28, 2017

(65) Prior Publication Data
US 2019/0300686 A1 Oct. 3, 2019

(30) Foreign Application Priority Data

Jun. 24, 2016 (EP) ..................................... 16176089

(51) Int. Cl.
*C08L 23/12* (2006.01)
*C08F 2/00* (2006.01)
*C08K 3/34* (2006.01)
*C08L 23/16* (2006.01)
*C08K 3/013* (2018.01)
*C08L 23/14* (2006.01)

(52) U.S. Cl.
CPC .............. *C08L 23/12* (2013.01); *C08K 3/013* (2018.01); *C08K 3/34* (2013.01); *C08L 23/16* (2013.01); *C08F 2/001* (2013.01); *C08F 2500/00* (2013.01); *C08F 2800/20* (2013.01); *C08L 23/14* (2013.01); *C08L 2205/025* (2013.01); *C08L 2205/03* (2013.01); *C08L 2205/24* (2013.01); *C08L 2207/02* (2013.01); *C08L 2310/00* (2013.01); *C08L 2314/02* (2013.01)

(58) Field of Classification Search
None
See application file for complete search history.

(56) References Cited

U.S. PATENT DOCUMENTS

| 5,756,567 | A | 5/1998 | Rohrmann | |
| 2017/0240734 | A1* | 8/2017 | Wang | C08L 23/12 |
| 2017/0313866 | A1* | 11/2017 | Wang | C08F 2/001 |

FOREIGN PATENT DOCUMENTS

| EP | 0491566 A3 | 9/1992 | |
| EP | 0591224 B1 | 2/1998 | |
| EP | 0586590 B1 | 7/1999 | |
| EP | 0887379 B1 | 12/2004 | |
| EP | 1988122 A1 | 11/2008 | |
| EP | 2036947 A1 * | 3/2009 | ............... C08K 3/26 |
| EP | 2036947 A1 | 3/2009 | |
| EP | 2154190 A1 | 2/2010 | |
| EP | 2530116 A1 | 12/2012 | |
| EP | 2594593 A1 | 5/2013 | |
| EP | 2610273 A1 | 7/2013 | |
| EP | 3015503 A1 | 5/2016 | |
| EP | 3015504 A1 | 5/2016 | |
| JP | 9-3298 A | 1/1997 | |
| WO | 99/24478 A1 | 5/1999 | |
| WO | 99/24479 A1 | 5/1999 | |
| WO | 00/68315 A1 | 11/2000 | |
| WO | 2004/000899 A1 | 12/2003 | |
| WO | 2004/111095 A1 | 12/2004 | |
| WO | 2009/082019 A1 | 7/2009 | |
| WO | 2009/124753 A1 | 10/2009 | |
| WO | 2009/129873 A1 | 10/2009 | |
| WO | 2012/139897 A1 | 10/2012 | |
| WO | 2015/091372 A1 | 6/2015 | |
| WO | 2016/066446 A1 | 5/2016 | |

(Continued)

OTHER PUBLICATIONS

Office action for Japanese Patent Application No. 2018-555685, dated Oct. 29, 2019.
Singh et al., "Triad sequence determination of ethylene-propylene copolymers—application of quantitative 13C NMR", Polymer Testing 28 (2009) pp. 475-479.
Resconi et al., "Selectivity in Propene Polymerization with Metallocene Catalysts", Chem. Rev. 2000, 100, pp. 1253-1345.
Kakugo et al., "13C NMR Determination of Monomer Sequence Distribution in Ethylene-Propylene Copolymers Prepared with d-TiC13-Al(C2H5)2Cl" Macromolecules 1982, 15, pp. 1150-1152.
H.N.Cheng, "13C NMR Analysis of Ethylene-Propylene Rubbers", Macromolecules 1984, 17, 1950-1955.
Wang et al., "Structural Analysis of Ethylene/Propylene Copolymers Synthesized with a Constrained Geometry Catalyst", Macromolecules 2000, 33, pp. 1157-1162.

(Continued)

*Primary Examiner* — Richard A Huhn
(74) *Attorney, Agent, or Firm* — Tarolli, Sundheim, Covell & Tummino LLP (57) ABSTRACT Polypropylene composition comprising (A) 60 to 95 wt % of a heterophasic polypropylene (HECO) comprising 10 to 30 wt % of dispersed phase with the dispersed phase having a comonomer content of 30 to 45 wt % and the HECO having a melt flow rate $MFR_{PP}$ in the range of 12 to 200 g/10 min and being prepared in the presence of a Ziegler Natta catalyst (ZN-C), (B) 0 to 15 wt % of one or more elastomers, (C) 5 to 20 wt % of at least one filler wherein the polypropylene composition fulfils inequation (1) fogging≤0.02 $MFR_{Comp}$+0.3. The composition allows for a well-balanced combination of a good impact/stiffness balance, a good scratch resistance, low VOC and FOG emissions and remarkable good fogging values.

13 Claims, 1 Drawing Sheet

(56) References Cited

FOREIGN PATENT DOCUMENTS

WO 2016/066453 A1 5/2016

OTHER PUBLICATIONS

Zhou et al., "A new decoupling method for accurate quantification of polyethylene copolymer composition and triad sequence distribution with 13C NMR", Journal of Magnetic Resonance 187 (2007) pp. 225-233.
Koch, et al., "Evaluation of scratch resistance in multiphase PP blends", Polymer Testing 26 (2007) 927-936.

* cited by examiner

POLYPROPYLENE COMPOSITIONS WITH LOW FOGGING

The present invention is directed to a polypropylene composition comprising a heterophasic polypropylene and at least one filler with an improved fogging performance over a wide MFR range. It further relates to the use of the inventive polypropylene composition for the production of extruded, blow moulded or injection moulded articles, the produced articles and automotive interior articles comprising the inventive polypropylene composition.

Automotive interior parts like dashboards, door claddings, trims etc. are commonly made from polymers; especially propylene based resins with fillers. Due to their chemical and thermal resistance they are widely used for these applications. However the demands are challenging, since many polymer properties are directly or indirectly interrelated, i.e. improving a specific property can only be accomplished on the expense of another property. For example increased stiffness of a polymer material is accompanied with a higher brittleness thus resulting in poor impact properties. Therefor filled heterophasic propylene based materials are preferred for automotive interior applications due to their better impact stiffness balance. A further important requirement for automotive applications is to maintain the high-quality perception till the end of the car's lifetime which means that the polymer should provide high resistance to scratches e.g. from keys, fingernails, rings etc. In order to achieve a good scratch resistance of the end product quite often auxiliary substances, such as for example HDPE and/or slip agents are added to the polymer. Moreover in the recent years for automotive applications low emissions as well as low amounts of volatile organic compounds, low fogging, reduction of odour and improved organoleptic properties of the polymer materials have become additional key issues, often summarized under the term EFO (Emission, FOG, Odour). Emissions and odours mainly originate from primary polymerization and degradation products of different chain length as well as from additives, and they also occur at normal atmospheric temperatures in the automotive interior end products.

From a chemical point of view, emissions are light, short-chain alkanes to oligomers. The total organic carbon emission of very light alkanes with a chain length of $C_3$-$C_{10}$ is measured according to VDA 277:1995. Volatile organic compounds (VOC) are defined as emissions of very light to light alkanes with a chain length of $C_4$ to $C_{20}$; they are measured according to VDA 278:2002. The FOG value is defined as emissions of additives, alkanes and oligomers with a chain length of $C_{16}$ to $C_{32}$; it is also measured according to VDA 278:2002. Some of the emitted volatile substances can form milky precipitates called "fogging" on the windscreen which have a negative influence on the visibility and thereby affect the safety of driver and passengers. The term "fogging" indicates the emission of additives and aliphatic oligomers with a chain length of $>C_{30}$. It designates gas releases from individual materials which then precipitate and can form a greasy film on the windscreen. Those condensable elements can be measured through a gravimetric fogging test, which determines the increase in weight due to condensation. Due to the fact that for the fogging value different substances than for VOC and FOG are responsible it is not possible to conclude from the VOC and FOG of a material to its fogging value. Moreover as fogging often is increased by additives which are added in order to achieve the required mechanical properties, reduced fogging values are a big challenge in the polymer industry.

In the prior art there are many documents available which deal with the EFO problem of polymer compositions for automotive interior applications.

EP 3 015 503, EP 3 015 504 and WO 2016/066453 disclose heterophasic polypropylene compositions (HECOs) comprising a crystalline propylene homopolymer matrix and an amorphous propylene copolymer with ethylene and/or a α-olefin with 4 to 10 carbon atoms being present in the matrix as dispersed particles. Optionally a crystalline ethylene copolymer is present in the composition as inclusions of the dispersed particles; and optionally an α-nucleating agent is present in the homopolymer matrix. The heterophasic polypropylene compositions are produced in the presence of a Ziegler-Natta catalyst and they show an improved impact/stiffness balance and low VOC and FOG values. However the document does not disclose filled compositions comprising the HECOs.

U.S. Pat. No. 7,935,766 discloses a propylene impact copolymer comprising a propylene-based polymer, a propylene/ethylene copolymer dispersed within the propylene-based polymer and a substituted phenylene aromatic diester. The latter is part of the Ziegler-Natta catalyst composition being present during the polymerization step for producing the propylene impact copolymer. The final product provides a high melt flow and low volatiles content (VOC). The impact copolymers can comprise nucleating agents and can be compounded with various additives such as antioxidants. The document does not disclose filled compositions comprising the propylene impact copolymers.

EP 2 154 190 discloses talc filled polypropylene compositions for automotive applications which contain specific substances such as hindered amine light stabilizers in order to achieve a low content of Volatiles according to VDA 277 and low VOC and FOG values according to VDA 278. The polypropylene compositions can be heterophasic propylene copolymers with the comonomers being ethylene or $C_4$ to $C_{10}$ α-olefins and they are prepared in the presence of Ziegler Natta or single site catalysts. However the compositions with good VOC and FOG values are based on polypropylene homopolymers and the document is completely silent about fogging and mechanical properties of the compositions.

EP 2 530 116 A1 discloses a polypropylene composition suitable for automotive interior applications comprising a heterophasic propylene copolymer, a talc filler, a triazine derivative and a phenolic antioxidant. The composition and the articles made therefrom have reduced amounts of Volatiles according to VDA 277. However the document is silent about the fogging values of the resulting polypropylene composition.

U.S. Pat. No. 5,756,567 suggests to add an additive combination of glyceryl monostearate plus fatty acid dialkanolamide in a mixing ratio in the range from 1:1 to 3:1 and a total amount of up to 1.5% by weight to a talcum reinforced propylene block copolymer in order to receive a combination of good antistatic and good fogging values. However in the inventive example a HECO with an MFI of 7 g/10 min, 5 w % of an EPM rubber with 48 w % of ethylene content is used and a fogging value of 0.92 mg is achieved with the composition having an MFI of 7.5 g/10 min. Compositions with higher MFR values are not disclosed.

WO 2009/124753 discloses a heterophasic polypropylene composition with low amounts of volatiles (VOC) and FOG according to VDA 278 and good mechanical properties such as a good scratch resistance. The composition comprises a propylene homopolymer, which has been blended with an ethylene copolymer with one or more comonomers selected from α-olefins with 4 to 12 carbon atoms as impact modifier. Optionally the polymer composition further contains an ethylene homopolymer and/or up to 20 wt % of at least one filler material. The propylene homopolymer is produced in the presence of a single site or a Ziegler Natta catalyst; the ethylene copolymer is produced in the presence of a single site metallocene catalyst. It can be seen from the examples that compositions with satisfying VOC and FOG values are limited to the use of propylene homopolymer materials produced with metallocene catalysts. The document is completely silent about the fogging value.

Although a lot of development work has been done in the field of heterophasic polypropylene compositions, it was up to now not possible to find a well-balanced polymer composition which combines all mentioned requirements over a wide MFR range. In this respect it has to be noted that good mechanical and/or emission and fogging values in the base polymers (HECOs) do not guarantee likewise good values in the final compounded polymer compositions. In fact during the compounding step there are added different materials such as e.g. elastomers, fillers, additives, slip agents, impact modifiers or the like in order to receive tailor made compositions. All those materials can have negative impacts on the properties of the polymer end products and especially fogging values are crucial in this respect. Moreover it is known that the higher the MFR of a compound the worse is the fogging value which means that it is a challenge to obtain good fogging values over the whole relevant MFR range of a polypropylene compound.

Therefore, there is still a need for a heterophasic polypropylene composition which while keeping an acceptable (low temperature) impact/stiffness balance, a good scratch resistance as well as low VOC and FOG emissions has low fogging values over a wide MFR range.

Hence, it is an object of the present invention to provide such a material.

SUMMARY OF THE INVENTION

The present invention is based on the finding that the above mentioned objects can be achieved by a particular polypropylene composition comprising
(A) 60 to 95 wt % based on the total weight of the final polypropylene composition of a heterophasic polypropylene (HECO) comprising 10 to 30 wt % of dispersed phase based on the total weight of the HECO with the dispersed phase having a comonomer content of 30 to 45 wt % and the HECO having a melt flow rate $MFR_{PP}$ in the range of 12 to 200 g/10 min and being prepared in the presence of a Ziegler Natta catalyst (ZN-C),
(B) 0 to 15 wt % of one or more elastomers based on the total weight of the final polypropylene composition,
(C) 5 to 20 wt % of at least one filler based on the total weight of the final polypropylene composition
wherein the polypropylene composition fulfils inequation (1)

fogging≤0.02 $MFR_{Comp}$+0.3 with the dispersed phase being measured as xylene cold soluble (XCS) fraction at 25° C. according to ISO 16152,
the comonomer content of the dispersed phase being measured with NMR, the $MFR_{Comp}$ and the $MFR_{PP}$ being measured at 230° C. and at a load of 2.16 kg according to ISO 1133 and the fogging being measured gravimetrically according to ISO 75201, method B.

This special composition fulfilling inequation (1) and comprising components (A) and (C) surprisingly allows for a well-balanced combination of a good impact/stiffness balance also at low temperatures, a good scratch resistance, low VOC and FOG emissions and remarkable good fogging values over a broad MFR range as can be seen by the examples below.

In a first embodiment of the present invention, the polypropylene composition as well as the heterophasic polypropylene component (A) is free of phthalic acid esters as well as their respective decomposition products; preferably the polypropylene composition as well as the heterophasic polypropylene component (A) is free of phthalic compounds as well as their respective decomposition products.

According to the present invention the term "phthalic compounds" refers to phthalic acid (CAS No. 88-99-3), its mono- and diesters with aliphatic, alicyclic and aromatic alcohols as well as phthalic anhydride.

The term "free of" phthalic acid esters, preferably phthalic compounds, in the meaning of the present invention refers to a heterophasic polypropylene composition in which no phthalic acid esters as well as no respective decomposition products, preferably no phthalic compounds as well as no respective decomposition products at all originating from the Ziegler Natta catalyst (ZN-C) are detectable.

In a further aspect the invention is related to the use of the polypropylene composition according to the invention for the production of extruded, blow moulded or injection moulded articles such as pouches and bags, pipes and fittings, transport packaging containers as well as components for car exteriors and interiors, like dashboards, door claddings, consoles, bumpers and trims and the produced articles.

In yet a further aspect the invention is directed to an article comprising the inventive polypropylene composition with the article being an automotive interior article.

DETAILED DESCRIPTION

In the following the individual components of the polypropylene composition according to the invention are defined in more detail.

Composition

The polypropylene composition of the present invention at least comprises (A) 60 to 95 wt % based on the total weight of the final polypropylene composition of a heterophasic polypropylene (HECO) and (C) 5 to 20 wt % of at least one filler based on the total weight of the final polypropylene composition and it fulfils inequation (1)

fogging≤0.02 $MFR_{Comp}$+0.3 (1)

Preferably the polypropylene composition of the present invention fulfils inequation (2)

fogging≤0.02 $MFR_{Comp}$+0.28 (2)

Still more preferably the polypropylene composition of the present invention fulfils inequation (3)

$$\text{fogging} \leq 0.02 \text{ MFR}_{Comp} + 0.26 \qquad (3)$$

In a preferred embodiment the polypropylene composition of the present invention in addition to components (A) HECO and (C) filler comprises one or more elastomers (B) in an amount of up to 15 wt % based on the total weight of the final polypropylene composition.

It is important that also the mechanical properties of the final polypropylene composition fulfil relevant requirements such as the impact strength at −20° C. being >2 kJ/m² and the tensile modulus being >1600 MPa. It is known in the art that mechanical properties of the final polymer composition are heavily influenced by the compounding step where the polymer composition is produced from the base polymer. For the same reason good mechanical properties of a base polymer do not necessarily mean that polymer compositions made of those polymers automatically show also good mechanical properties. Therefore there are often added elastomers during compounding in order to guarantee the desired mechanical values of the final compositions.

Therefore in a preferred embodiment the polypropylene composition of the present invention additionally comprises 5 to 15 wt % and in an especially preferred embodiment comprises 10 to 15 wt % of one or more elastomers (B), based on the total weight of the final polypropylene composition.

In a preferred option the polypropylene composition according to the invention is further comprising up to 5 wt % additives like nucleating agents and antioxidants as well as slip agents and optionally up to 5 wt % of a colour masterbatch, based on the total weight of the final polypropylene composition. In a more preferred option the polypropylene composition is further comprising up to 4 wt %, especially preferred up to 3 wt % additives and optionally up to 3 wt %, especially preferred up to 2 wt % of a colour masterbatch, based on the total weight of the final polypropylene composition. In an even more preferred embodiment the polypropylene composition further comprises up to 3 wt % additives and up to 2 wt % of a colour masterbatch, based on the total weight of the final polypropylene composition.

Further it is appreciated that the polypropylene composition according to the present invention has an $\text{MFR}_{Comp}$ measured at 230° C. and at a load of 2.16 kg according to ISO 1133 in the range of 5 to 90 g/10 min, preferably in the range of 5 to 80 g/10 min, more preferably in the range of 10 to 70 g/10 min, most preferably in the range of 10 to 35 g/10 min.

The polymer composition of the present invention can be prepared by any suitable method known in the art, such as by blending the heterophasic polypropylene component (A) with the other components either directly, e.g., in an extruder, such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or a twin screw extruder may be used.

Heterophasic PP Component (A)

The heterophasic polypropylene (HECO) of component (A) contained in the polypropylene composition according to the present invention comprises a matrix (M) being a propylene homopolymer (H-PP). The matrix (M) contains a dispersed phase with the dispersed phase comprising an elastomeric propylene copolymer (EC). Thus the matrix (M) contains (finely) dispersed inclusions being not part of the matrix (M) and said inclusions contain the elastomeric propylene copolymer (EC). The term "inclusion" according to this invention shall preferably indicate that the matrix and the inclusion form different phases within the heterophasic polypropylene (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic polypropylene (HECO) of component (A) according to this invention comprises as polymer components only the polymer matrix (M) i.e. the propylene homopolymer (H-PP) and the elastomeric propylene copolymer (EC) comprised in the dispersed phase. In other words, the heterophasic polypropylene (HECO) may contain further additives but no other polymer in an amount exceeding 5.0 wt %, more preferably exceeding 3.0 wt %, like exceeding 1.0 wt %, based on the total heterophasic polypropylene (HECO). One additional polymer which may be present in such low amounts is a polyethylene which is a by-reaction product obtained by the preparation of the heterophasic polypropylene (HECO).

As mentioned above the polymer matrix (M) of the heterophasic polypropylene (HECO) of component (A) of the present invention is a propylene homopolymer (H-PP). The expression "propylene homopolymer" as used throughout the instant invention relates to a polypropylene that consists substantially, i.e. of equal or above than 99.0 wt %, more preferably of equal or above than 99.5 wt %, like equal or above than 99.8 wt %, of propylene units. In a preferred embodiment only propylene units in the propylene homopolymer are detectable. The polymer matrix (M) may consist of a single polymer, like a propylene homopolymer, but may also comprise a mixture of (two) different propylene polymers, like different propylene homopolymers. Ideally, however a single polymer, like a single propylene homopolymer (H-PP), is present.

The heterophasic polypropylene (HECO) of component (A) contained in the polypropylene composition according to the present invention apart from propylene comprises also comonomers. Preferably the heterophasic polypropylene (HECO) apart from propylene comprises monomers copolymerizable with propylene such as for example ethylene and/or $C_4$ to $C_{10}$ α-olefins. Accordingly the heterophasic polypropylene within the meaning of this invention is understood as a polypropylene comprising, preferably consisting of, units derivable from propylene and ethylene and/or $C_4$ to $C_{10}$ α-olefins. The monomers copolymerizable with propylene (comonomers), in particular ethylene and/or $C_4$ to $C_{10}$ α-olefins, e.g. 1-butene and/or 1-hexene are contained in the elastomeric propylene copolymer (EC) in the dispersed phase of the heterophasic polypropylene (HECO) of component (A).

It is thus preferred that the dispersed phase of the heterophasic polypropylene (HECO) of component (A) is comprising an elastomeric propylene copolymer (EC) with ethylene and/or $C_4$ to $C_{10}$ α-olefins.

Preferably, the heterophasic polypropylene (HECO) of component (A) contained in the polypropylene composition according to this invention comprises monomers copolymerizable with propylene (comonomers) from the group consisting of ethylene, 1-butene and 1-hexene. More specifically, the heterophasic polypropylene (HECO) comprises—apart from propylene—units derivable from ethylene and/or 1-butene. In a preferred embodiment, the heterophasic polypropylene (HECO) comprises units derivable from ethylene and propylene only. Accordingly, the elastomeric propylene copolymer (EC) in the dispersed phase is preferably an ethylene propylene rubber (EPR). Accordingly in one specific embodiment the comonomer in the dispersed phase of the heterophasic polypropylene (HECO) is ethylene only.

The heterophasic polypropylene (HECO) of component (A) contained in the polypropylene composition according to the present invention comprises 10 to 30 wt %, preferably 10 to 20 wt %, more preferably 12 to 18 wt % of dispersed phase based on the total weight of the HECO.

The share of the dispersed phase in the heterophasic polypropylene (HECO) is also indicated as "xylene cold soluble (XCS) fraction of the heterophasic polypropylene (HECO)". In other words, the terms "dispersed phase", "xylene cold soluble (XCS) fraction of the heterophasic polypropylene (HECO)", "elastomeric propylene copolymer (EC)" and "ethylene-propylene rubber (EPR)" denote the same, i.e. are interchangeable.

The dispersed phase of the heterophasic polypropylene (HECO) of component (A) contained in the polypropylene composition according to the present invention has a comonomer content of 30 to 45 wt %, preferably of 35 to 45 wt %, measured with NMR. The percentage amount of the $C_2$ and/or $C_4$ to $C_{10}$ α-olefin content of the xylene cold soluble (XCS) fraction hence of the dispersed phase corresponds to the comonomer content of the xylene cold soluble (XCS) fraction of the heterophasic polypropylene (HECO) of component (A). As according to the above mentioned specific embodiment the comonomer in the dispersed phase is ethylene only, the comonomer content of the XCS fraction of the HECO of component (A) corresponds to the $C_2$ content of the XCS fraction ($C_2$/XCS).

Accordingly in a very preferred embodiment the polypropylene composition of the present invention is comprising components (A), (B) and (C) as specified in Claim 1 with the comonomer content of the dispersed phase corresponding to the $C_2$ content of the xylene cold soluble (XCS) fraction ($C_2$/XCS).

The heterophasic polypropylene (HECO) of component (A) contained in the polypropylene composition according to the present invention is featured by a moderate melt flow rate. Accordingly, the heterophasic polypropylene (HECO) has a melt flow rate $MFR_{PP}$ in the range of 12 to 200.0 g/10 min. In a preferred embodiment the heterophasic polypropylene (HECO) has a melt flow rate $MFR_{PP}$ in the range of 12 to 120 g/10 min, even more preferred in the range of 12 to 100 g/10 min, measured at 230° C. and at a load of 2.16 kg according to ISO 1133.

The xylene cold soluble (XCS) fraction and hence the dispersed phase of the heterophasic polypropylene (HECO) of component (A) contained in the polypropylene composition according to the present invention is furthermore specified by its intrinsic viscosity (IV). A low intrinsic viscosity (IV) value reflects a low weight average molecular weight. For the present invention it is preferred that the xylene cold soluble fraction (XCS) of the heterophasic polypropylene (HECO) has an intrinsic viscosity (IV) in the range of 1.5 to 6.0 dl/g, more preferably in the range of 2.0-4.0 dl/g, still more preferably in the range of 2.2-3.0 dl/g wherein the intrinsic viscosity (IV) is measured in decalin at 135° C. according to DIN ISO 1628/1, October 1999.

The heterophasic polypropylene (HECO) of component (A) contained in the polypropylene composition according to the present invention has been prepared in the presence of a Ziegler Natta catalyst (ZN-C). The nature of the catalyst influences in particular the microstructure of the polymer. For instance, polypropylenes prepared by using a certain Ziegler Natta catalyst (ZN-C) provide a different microstructure compared to polypropylenes prepared by using a different Ziegler Natta catalyst (ZN-C), as the incorporation of the comonomer into the dispersed phase happens more blocky to a certain extent (which is expressed by the triad distribution). Thus for the preparation of the heterophasic polypropylene (HECO) of component (A) in the present invention a specific Ziegler Natta catalyst (ZN-C) is used.

Preferably the catalyst used in the present invention is a Ziegler Natta catalyst (ZN-C), which comprises compounds of a transition metal of Group 4 to 6 of IUPAC, like titanium, a Group 2 metal compound, like a magnesium, and an internal donor being a non-phthalic compound, preferably a non-phthalic acid ester and/or a non-phthalic diether, the ester more preferably being a diester of non-phthalic dicarboxylic acids, the diether more preferably being a 1,3-diether as described in more detail below. Thus, the catalyst is fully free of undesired phthalic compounds. Further, the catalyst is a solid catalyst which is free of any external support material, like silica or $MgCl_2$, but the catalyst is self-supported. Preferably the Group 2 metal is magnesium. The transition metal compound of Group 4 to 6 is preferably a titanium compound (TC), most preferably a titanium halide, like $TiCl_4$.

The Ziegler Natta catalyst (ZN-C) can be further defined by the way it is obtained; typically the Ziegler Natta catalyst (ZN-C) can be obtained via precipitation method or via emulsion-solidification method. In both methods the catalyst chemistry is the same.

The non-phthalic internal donor used in the preparation of the catalyst used in the present invention is preferably selected from (di)esters of non-phthalic carboxylic (di)acids, diethers such as 1,3-diethers, derivatives and mixtures thereof; in case of mixtures it is preferred that the molar ratio between the (di)ester donor and the diether donor is in the range of 50 to 0.02, more preferably in the range of 30 to 0.1. Especially preferred as internal donor are diesters of mono-unsaturated dicarboxylic acids and 1,3-diethers, derivatives and mixtures thereof. It is especially preferred for the preparation of the polypropylene composition according to the present invention that the internal donor is selected from a group comprising malonates, maleates, succinates, citraconates, glutarates, cyclohexene-1,2-dicarboxylates, benzoates and 1,3-diethers, and any derivatives and/or mixtures thereof.

The finally obtained Ziegler Natta catalyst (ZN-C) is desirably in the form of particles having generally an average particle size range of 5 to 200 μm, preferably 10 to 100 μm. Typically the amount of Ti is 1 to 6 wt %, Mg 10 to 20 wt % and internal donor 10 to 40 wt % of the catalyst composition.

Suitable catalysts which can be used in the present invention are known in the art and are for example disclosed in WO99/571560, WO2012/049204, WO2012/139897, EP2594593, EP2610273, WO2016/066446, EP3015504, WO2016/066453. Suitable catalysts are also available on the market as for example the Avant ZN180M, Avant ZN168M, Avant ZN127M catalysts of Lyondell Basell.

The Ziegler Natta catalyst (ZN-C) present during the preparation of the heterophasic polypropylene (HECO) of component (A) contained in the polypropylene composition of the present invention is preferably used in association with a cocatalyst and optionally external donors.

It is preferred that during the preparation of the heterophasic polypropylene (HECO) contained in the polypropylene composition of the present invention an external donor is present. Suitable external donors include certain silanes, ethers, esters, amines, ketones, heterocyclic compounds and blends of these. It is especially preferred to use a silane; even more preferred external donors are the dicyclopentyl dimethoxy silane donor (D-donor) or the cyclohexylmethyl dimethoxy silane donor (C-Donor).

In addition to the Ziegler Natta catalyst (ZN-C) and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] are carefully chosen. Accordingly, the mol ratio of co-catalyst (Co) to external donor (ED) [Co/ED] must be in the range of 5 to 45, preferably is in the range of 5 to 35, more preferably is in the range of 5 to 25; and optionally the mol-ratio of co-catalyst (Co) to titanium compound (TC) [Co/TC] must be in the range of above 80 to 500, preferably is in the range of 100 to 350, still more preferably is in the range of 120 to 300.

A detailed description of external donors, co-catalysts and the ratio between the co-catalyst (Co) and the external donor (ED) [Co/ED] and/or the ratio between the co-catalyst (Co) and the transition metal (TM) [Co/TM] are disclosed in EP 3 015 503, EP 3 015 504, WO 2016/066453, which are incorporated herein by reference.

The heterophasic polypropylene (HECO) of component (A) contained in the polypropylene composition according to the present invention is thus preferably produced in the presence of
(a) a Ziegler Natta catalyst (ZN-C) comprising compounds of a transition metal of Group 4 to 6 of IUPAC, a Group 2 metal compound and an internal donor, wherein said internal donor is a non-phthalic compound, preferably is a non-phthalic acid ester and/or a non-phthalic diether, and still more preferably the ester being a diester of non-phthalic dicarboxylic acids, and the diether more preferably being a 1,3-diether;
(b) optionally a co-catalyst (Co), and
(c) optionally an external donor (ED).

The heterophasic polypropylene (HECO) of component (A) contained in the polypropylene composition according to the present invention is preferably produced in a multi-stage process comprising at least two reactors, preferably at least three reactors, connected in series. In such a process the polymer matrix (M) is produced first and in a subsequent step the elastomeric propylene copolymer (EC) forming the dispersed phase is produced in the presence of the matrix (M). Thus the elastomeric propylene copolymer (EC) comprised in the dispersed phase of the heterophasic polypropylene (HECO) is produced in situ. This enables a good distribution and a good homogeneity of the dispersed phase in the polymer matrix (M) and thus constitutes a structural difference compared to heterophasic polypropylenes (HECOs) produced by blending the polymer matrix (M) after the polymerization with a separately produced elastomeric propylene copolymer (EC).

Accordingly the heterophasic polypropylene (HECO) of component (A) contained in the polypropylene composition according to the present invention is produced by polymerizing
(I) propylene so as to form the polymer matrix (M) being a propylene homopolymer (H-PP) and subsequently polymerizing
(II) propylene and ethylene and/or a $C_4$ to $C_{10}$ α-olefin different to propylene, preferably ethylene, preferably in the gas phase, so as to form the elastomeric propylene copolymer (EC) comprised in the dispersed phase in said matrix (M)
wherein preferably both steps (I) and (II) take place in the presence of the same Ziegler-Natta solid catalyst (ZN-C), preferably a catalyst as defined above.

Preferably the heterophasic polypropylene (HECO) is obtained by a sequential polymerization process comprising the steps of
(a) polymerizing in a first reactor propylene thereby obtaining a first propylene homopolymer fraction,
(b) transferring said first propylene homopolymer fraction in a second reactor,
(c) polymerizing in said second reactor in the presence of the first propylene homopolymer fraction, propylene obtaining a second propylene homopolymer fraction, said first propylene homopolymer fraction and said second propylene homopolymer fraction form the polymer matrix (M), e.g. the propylene homopolymer (H-PP),
(d) transferring said polymer matrix (M) in a third reactor,
(e) polymerizing in said third reactor in the presence of the polymer matrix (M) propylene and ethylene and/or $C_4$ to $C_{10}$ α-olefin obtaining an elastomeric propylene copolymer (EC), said polymer matrix (M) and said elastomeric propylene copolymer (EC) comprised in the dispersed phase form the heterophasic propylene copolymer (HECO) of component (A) of the present invention,
wherein preferably the steps take place in the presence of the same Ziegler Natta solid catalyst (ZN-C), preferably a catalyst as defined above.

The term "sequential polymerization process" indicates that the heterophasic polypropylene (HECO) of component (A) contained in the polypropylene composition according to the present invention is produced in at least two, like three or four reactors connected in series. Accordingly the present process comprises at least a first reactor, a second reactor, and optionally a third and fourth reactor. The term "polymerization process" shall indicate that the main polymerization takes place. Thus in case the process consists of four polymerization reactors, this definition does not exclude the option that the overall process comprises for instance a pre-polymerization step in a pre-polymerization reactor.

The first reactor is preferably a slurry reactor and can be any continuous or simple stirred batch tank reactor or loop reactor operating in bulk or slurry. Bulk means a polymerization in a reaction medium that comprises at least 60 wt % monomer. According to the present invention a slurry reactor is preferably a (bulk) loop reactor. The second reactor can be either a slurry, like a loop reactor or a gas phase reactor (GPR). The third and fourth reactor (if present) are preferably gas phase reactors (GPR). Such gas phase reactors can be any mechanically mixed or fluid bed reactors. Preferably the gas phase reactors comprise a mechanically agitated fluid bed reactor with gas velocities of at least 0.2 m/sec.

Thus it is appreciated that the gas phase reactor is a fluidized bed type reactor preferably with a mechanical stirrer.

In a preferred embodiment the first and the second reactor are slurry, like loop reactors, whereas the third and optionally the fourth reactor are gas phase reactors (GPR).

Accordingly for the instant process at least three, preferably three polymerization reactors, namely first slurry reactor, like loop reactor, a second slurry reactor, like loop reactor and a gas phase reactor (GPR), connected in series, are used. If needed prior to the first slurry reactor a prepolymerization reactor is placed.

A suitable slurry-gas phase process is the Spheripol® process of Basell.

A further suitable multistage process is a "loop-gas phase"-process, such as developed by Borealis (known as BORSTAR® technology) described e.g. in patent literature, such as in EP 0 887 379, WO 92/12182 WO 2004/000899, WO 2004/111095, WO 99/24478, WO 99/24479, WO 00/68315. Suitable processes are also described in EP 3 015 503, EP 3 015 504, WO2016/066453.

Preferably, for producing the heterophasic polypropylene (HECO) of component (A) contained in the polypropylene composition according to the present invention the conditions for the slurry reactors like loop reactors, e.g. the first and optionally the second reactor, may be as follows:
the temperature is within the range of 50° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Preferably, for producing the heterophasic polypropylene (HECO) of component (A) contained in the polypropylene composition according to the present invention the conditions for the gas phase reactors (GPR) e.g. the second and/or third and fourth reactor (if present), are as follows:
the temperature is within the range of 50° C. to 130° C., preferably between 60° C. and 100° C.,
the pressure is within the range of 5 bar to 50 bar, preferably between 10 bar to 35 bar,
hydrogen can be added for controlling the molar mass in a manner known per se.

The residence time can vary in the individual reactors.

In one embodiment of the process for producing the heterophasic polypropylene (HECO) of component (A) the residence time in the slurry (bulk) reactor, e.g. loop reactor is in the range of 0.1 to 3.5 hours, e.g. 0.15 to 3.0 hours and the residence time in gas phase reactor will generally be 0.2 to 6.0 hours, like 0.3 to 5.0 hours.

If desired, the polymerization may be effected in a known manner under supercritical conditions in the first and optionally in the second reactor, i.e. in the slurry reactor, like in the loop reactor, and/or as a condensed mode in the gas phase reactors.

According to the invention the heterophasic polypropylene (HECO) of component (A) contained in the polypropylene composition of the present invention has been produced in the presence of a Ziegler Natta catalyst (ZN-C).

Therefor preferably, the process for producing the heterophasic polypropylene (HECO) comprises also a prepolymerization with the catalyst system comprising a Ziegler Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein. The prepolymerization reaction is typically conducted at a temperature of 10 to 60° C., preferably from 15 to 50° C., and more preferably from 15 to 35° C.

The pressure in the prepolymerization reactor is not critical but must be sufficiently high to maintain the reaction mixture in liquid phase. Thus, the pressure may be from 20 to 100 bar, for example from 30 to 70 bar.

The catalyst components are preferably all introduced to the prepolymerization step. However, where the solid catalyst component and the cocatalyst can be fed separately it is possible that only a part of the cocatalyst is introduced into the prepolymerization stage and the remaining part into subsequent polymerization stages. It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

Component (B) Elastomer

Optionally the polypropylene composition of the present invention comprises one or more elastomers in an amount of up to 15 wt %, preferably in an amount of 5 wt % to 15 wt %, even more preferably in an amount of 10 wt % to 15 wt %, based on the total weight of the final polypropylene composition (component B).

Elastomers are usually added to a polymer composition in order to achieve the desired mechanical properties; normally the addition is done during compounding of the individual components. Thus the elastomer(s) of component (B) in the polypropylene composition of the present invention has been produced separately.

Preferably, the elastomer(s) of component (B) in the polypropylene composition of the present invention is an ethylene-higher-α-olefin elastomer with the higher α-olefin having 4 to 12 carbon atoms, more preferably having 4 to 8 carbon atoms. Therefore ethylene-1-butene to ethylene-1-octene copolymers is preferred as elastomer(s) of component (B) in the present invention. Alternatively an Ethylene Propylene Rubber (EPR) or an Ethylene Propylene Diene Monomer (EPDM) can be used as elastomer(s) of component (B) in the present invention. Examples of possible elastomers are the Queo® grades distributed by Borealis or Engage® products from Dow.

In a preferred embodiment the density of the elastomer(s) of component (B) in the polypropylene composition of the present invention is below 935 kg/m$^3$, preferably the density is in the range of 850 to 900 kg/m$^3$, more preferably in the range of 860 to 880 kg/m$^3$, such as for example about 870 kg/m$^3$. It is important that the density of the elastomer(s) of component (B) is not too high, hence is below 935 kg/m$^3$, as otherwise the final polymer composition becomes too brittle. The density is measured according to ISO 1183-1. The sample preparation was executed according to ISO 1872-2 (compression moulding).

The elastomer is normally added to the polymer composition by compounding it into the heterophasic polypropylene (HECO) of component (A) by any suitable method known in the art, such as by blending the elastomer(s) of component (B) with the other components either directly, e.g. in an extruder such that the same extruder is used to make the finished product, or by pre-melt mixing in a separate mixer or extruder. For mixing, a conventional compounding or blending apparatus, e.g. a Banbury mixer, a 2-roll rubber mill, Buss-co-kneader or twin screw extruder may be used.

Component (C) Filler; Additives

The polypropylene composition according to the present invention contains 5 to 20 wt % of at least one filler based on the total weight of the final polypropylene composition.

As for fillers any mineral filler can be used in the present invention. However it is preferred that the mineral filler is a phyllosilicate, mica or wollastonite. Even more preferred the mineral filler is selected from the group consisting of mica, wollastonite, kaolinite, smectite, montmorillonite and talc. The most preferred inorganic filler is talc. Preferably, the mineral filler has a median particle size d50 [mass percent] of equal to or below 10 µm, more preferably below 5.0 µm, like below 3.0 µm. The mineral filler preferably has a cutoff particle size d95 [mass percent] of equal to or below 20.0 µm, more preferably below 10.0 µm, like below 8.0 µm. Typically the mineral filler has a surface area of less than 50 $m^2/g$, more preferably of less than 30 $m^2/g$, yet more preferably of less than 25 $m^2/g$. Mineral fillers fulfilling these requirements are preferably anisotropic mineral fillers, like talc, mica and wollastonite.

In a preferred option the polypropylene composition according to the invention is further comprising up to 5 wt % additives and optionally up to 5 wt % of a colour masterbatch, based on the total weight of the final polypropylene composition.

Possible additives are for example slip agents, nucleating agents, antioxidants, UV-stabilizers, lubricants, silicon masterbatches or the like. Suitable slip agents are for example those being unsaturated fatty acid amides. The amount of carbon atoms of the fatty acids is preferably in the range of 10 to 25. A preferred slip agent is (Z)-docos-13-enamide (Erucamide), CAS No. 112-84-5 with the trade name: Crodamide ER-BE-(HU), from Croda.

Suitable additives and fillers are well known in the art and can be found for example in the "Additives for Plastics" Handbook, J. Murphy, Elsevier, $2^{nd}$ edition, 2001. The additives can be added as pure agents or as masterbatches, such as for example as silicon masterbatch. Those methods are well known in the art too.

In a further aspect the invention is related to the use of the polypropylene composition according to the invention for the production of extruded, blow moulded or injection moulded articles such as pouches and bags, pipes and fittings, transport packaging containers as well as components for car exteriors and interiors, like dashboards, door claddings, consoles, bumpers and trims and the produced articles. Preferably the polypropylene composition is used for the production of automotive articles, like moulded automotive articles, e.g. automotive injection moulded articles.

In yet a further aspect the invention is directed to an article comprising the inventive polypropylene composition with the article being an automotive interior article.

According to a preferred embodiment of the present invention, automotive interior articles comprising the polypropylene composition of the present invention are dash boards, instrument panels, door claddings, arm rests, gear sticks, shift lever knobs, mats, interior skins, trunk claddings, or interior trims.

In a preferred embodiment the articles, such as the above mentioned automotive interior articles, are comprising the polypropylene composition according to the invention to at least 60 wt %, preferably at least 80 wt %, more preferably at least 95 wt %, and most preferably are consisting of the inventive polypropylene composition.

As the polypropylene compositions of the present invention show a very well balanced combination of good low temperature impact/stiffness values, low VOC and FOG values, a good scratch resistance and remarkable good fogging values the compositions are especially suitable for e.g. automotive interior applications with their multiple requirements. Due to the fact that the good properties are achievable over a broad MFR range it is moreover possible to use a big variety of matrix materials for producing the articles and thus cover various application fields.

In the following the present invention is further illustrated by means of examples, without being limited to them.

EXAMPLES

The following definitions of terms and determination methods apply for the above general description of the invention as well as to the below examples unless otherwise defined.

1. Measuring Methods

Xylene Cold Soluble fraction (XCS, wt %): The amount of the polymer soluble in xylene is determined at 25° C. according to ISO 16152; $5^{th}$ edition; 2005-07-01.

Comonomer Content of the dispersed phase of the HECO by NMR spectroscopy: Quantitative nuclear-magnetic resonance (NMR) spectroscopy was further used to quantify the comonomer content and commoner sequence distribution of the polymers. Quantitative $_{13}C\{_1H\}$ NMR spectra were recorded in the solution-state using a Bruker Advance III 400 NMR spectrometer operating at 400.15 and 100.62 MHz for $_1H$ and $_{13}C$ respectively. All spectra were recorded using a $_{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 5 1128). A total of 6144 (6 k) transients were acquired per spectra.

Quantitative $_{13}C\{_1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $_{13}C\{_1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes: $E=0.5(I_H+I_G+0.5(I_C+I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration region slightly adjusted to increase applicability to a wider range of comonomer contents.

$MFR_{PP}$, $MFR_{Comp}$, $MFR_{Matrix}$ (230° C.; 2.16 kg): The melt flow rate is measured as the $MFR_{PP}$ (HECO) respectively $MFR_{Comp}$ (composition) and $MFR_{Matrix}$ (Matrix) at 230° C. and at a load of 2.16 kg for polypropylene in accordance with ISO 1133. The MFR is an indication of the flowability, and hence the processability, of the polymer. The higher the melt flow rate, the lower the viscosity of the polymer.

Density (Elastomer): The density of the elastomer is measured according to ISO 1183-1. The sample preparation is executed according to ISO 1872-2, (compression moulding).

Intrinsic viscosity (IV) of dispersed phase of HECO: The IV values e.g. of the XCS fraction are measured at 135° C. in decalin according to DIN ISO 1628/1, October 1999. The IV value increases with the molecular weight of a polymer.

Charpy notched Impact Strength: Charpy notched impact is measured according to ISO 179/1eA at +23° C. and at −20° C. using an injection moulded test specimen (80×10×4 mm) as produced according to ISO 1873.

Tensile modulus, Tensile strength, Tensile strain at tensile strength, Elongation at break: The tensile properties are determined according to ISO 527-1 and 2 on injection moulded specimen, type 1B. The injection moulding is performed according to ISO 1873.

Scratch Resistance: To determine the scratch visibility, a Cross Hatch Cutter Model 420P, manufactured by Erichsen, was used. For the tests, plaques of 70×70×4 mm size were cut from a moulded grained plaque of size 140×200×4 mm (grain parameters: average grain size=1 mm, grain depth=0.12 mm, conicity=6°). The period between injection moulding of specimens and scratch-testing was 7 days.

For testing, the specimens must be clamped in a suitable apparatus as described above. Scratches were applied at a force of 10 N using a cylindrical metal pen with a ball shaped end (radius=0.5 mm±0.01). A cutting speed of 1000 mm/min was used.

A minimum of 20 scratches parallel to each other were brought up at a load of 10 N with a distance of 2 mm. The application of the scratches was repeated perpendicular to each other, so that the result was a scratching screen. The scratching direction should be unidirectional.

The scratch visibility is reported as the difference of the luminance, $\Delta L$, of the unscratched and the scratched areas. $\Delta L$ values were measured using a spectrophotometer that fulfils the requirements to DIN 5033.

A detailed test description of the test method (Erichsen cross hatch cutter method) can be found in the article "Evaluation of scratch resistance in multiphase PP blends" by Thomas Koch and Doris Machl, published in Polymer Testing, 26 (2007), p. 927-936.

VOC: is determined according to VDA 278:2002 from pellets. VOC according to VDA 278 is the sum of all high and medium volatile compounds. It is calculated as toluene equivalent (TE). VOC according to VDA 278 represents all organic compounds in the boiling point and elution range of up to $C_{20}$ (n-eicosane).

FOG: is determined according to VDA 278:2002 from pellets. FOG according to VDA 278 is the sum of all organic compounds of low volatility, which have an elution time greater than or equal to n-hexadecane. FOG is calculated as hexadecane equivalent (HD). FOG according to VDA 278 represents organic compounds in the boiling point range of n-alkanes $C_{16}$ to $C_{32}$.

VDA standards are issued by "Verband der Automobilindustrie". The VDA standards used herein are available from "Dokumentation Kraftfahrwesen (DKF); Ulrichstrasse 14, D-74321 Bietigheim-Bissingen, Germany or can be downloaded from their website (www.dkf-ev.de).

Fogging: Fogging is measured according to ISO 75201, method B on compression moulded specimens (diameter 80 mm+/−1 mm, thickness 2 mm) cut out from an injection moulded plate. Fogging means the evaporation of volatiles matters of trim materials of vehicles. This method evaluates the volatility of organic constituents by gravimetric measurements. The samples were dried at room temperature for 24 h using silica gel in a desiccator. The test was done at 100° C. The beakers have to be closed by using tarred aluminium foils (diameter 103 mm, thickness 0.03 mm) and glass plates and the cooling plates on top. After the testing time (16 h at 100° C.) the glass plates have to be removed (not usefully anymore at this method), the aluminium foils are removed and weighted back. The gravimetric fogging value "G" (%) shall be determined by the following equation:

G=weight of aluminium foil after fogging test−tare of the aluminium foil, in mg

G sample=Average in mg of the 2 foils used for each sample

2. Examples

For the preparation of the heterophasic polypropylene (HECO) of component (A) of inventive examples IE1 to IE4 there was used a Lyondell Basell catalyst Avant ZN180M. Polymerization was performed in a Spheripol plant, comprising a prepolymerization reactor, two loop reactors (R1, R2) and a gas phase reactor (GPR). The polymerization conditions are indicated in Table 1.

TABLE 1

Polymerization of the heterophasic polypropylenes (HECOs) of inventive Examples IE1 to IE4

|  |  | HECO IE1 | HECO IE2/IE4 | HECO IE3 |
|---|---|---|---|---|
| Prepoly |  |  |  |  |
| Residence time | [h] | 0.2 | 0.2 | 0.2 |
| Temperature | [° C.] | 28 | 28 | 28 |
| Co/ED ratio | [mol/mol] | 200 | 200 | 200 |
| Co/TC ratio | [mol/mol] | 5 | 5 | 5 |
| Loop (R1) |  |  |  |  |
| Residence time | [h] | 0.3 | 0.3 | 0.3 |
| Temperature | [° C.] | 70 | 70 | 70 |
| Pressure | [bar] | 45 | 45 | 45 |
| $H_2/C_3$ ratio | [mol/kmol] | 10.1 | 5.5 | 7.5 |
| $MFR_2$ | [g/10 min] | 90 | 27 | 160 |
| XCS | [wt %] | 2 | 1.9 | 2.2 |
| split | [wt %] | 43 | 43 | 43 |
| Loop (R2) |  |  |  |  |
| Residence time | [h] | 0.3 | 0.3 | 0.3 |
| Temperature | [° C.] | 70 | 70 | 70 |
| Pressure | [kPa] | 43 | 43 | 43 |
| $H_2/C_3$ ratio | [mol/kmol] | 10.1 | 5.5 | 7.5 |
| $MFR_{Matrix}$ | [g/10 min] | 90 | 27 | 160 |
| XCS | [wt %] | 2 | 1.9 | 2.2 |
| split | [wt %] | 42 | 43 | 43 |
| 1$^{st}$ GPR (R3) |  |  |  |  |
| Residence time | [h] | 1.2 | 1.1 | 1.1 |
| Temperature | [° C.] | 80 | 80 | 80 |
| Pressure | [bar] | 13 | 13 | 13 |
| $C_2/C_3$ ratio | [mol/kmol] | 515 | 612 | 515 |
| $H_2/C_2$ ratio | [mol/kmol] | 0.08 | 0.03 | 0.11 |
| $MFR_{PP}$ | [g/10 min] | 42 | 13.5 | 90 |
| $C_2$ content | [wt %] | 7.2 | 8.4 | 6.3 |
| $C_2/XCS$ | [wt %] | 42 | 44 | 42 |
| XCS | [wt %] | 15.5 | 16 | 14 |
| split | [wt %] | 15 | 14 | 14 |
| MFR ratio $MFR_{PP}/MFR_{Matrix}$ | | — | 0.47 | 0.5 |

For the preparation of the heterophasic polypropylene (HECO) of component (A) of comparative examples CE1 and CE2 a catalyst like described in EP 591 224 or EP 586 390 or like the ones preferred according to EP 491 566 was used. Polymerization was performed in a Spheripol plant, comprising a prepolymerization reactor, two loop reactors (R1, R2) and a gas phase reactor (GPR).

The polymerization conditions are indicated in Table 2.

TABLE 2

Polymerization of the heterophasic polypropylene (HECO) of comparative Examples CE1 and CE2

|  |  | HECO CE1 | HECO CE2 |
|---|---|---|---|
| Prepoly |  |  |  |
| Residence time | [h] | 0.3 | 0.3 |
| Temperature | [° C.] | 30 | 30 |
| Co/ED ratio | [mol/mol] | 200 | 200 |
| Co/TC ratio | [mol/mol] | 15 | 15 |
| Loop (R1) |  |  |  |
| Residence time | [h] | 0.4 | 0.4 |
| Temperature | [° C.] | 70 | 70 |
| pressure | [bar} | 45 | 45 |
| $H_2/C_3$ ratio | [mol/kmol] | 18.3 | 9.5 |
| $MFR_2$ | [g/10 m]in | 90 | 27 |
| XCS | [wt %] | 2 | 1.9 |
| split | [wt %] | 42 | 42 |
| Loop (R2) |  |  |  |
| Residence time | [h] | 0.4 | 0.4 |
| Temperature | [° C.] | 70 | 70 |
| Pressure | [bar] | 43 | 43 |
| $H_2/C_3$ ratio | [mol/kmol] | 18.3 | 9.5 |
| $MFR_{Matrix}$ | [g/10 min] | 90 | 27 |
| XCS | [wt %] | 2 | 1.9 |
| $C_2$ content | [wt %] |  |  |
| split | [wt %] | 43 | 43 |
| 1st GPR (R3) |  |  |  |
| Residence time | [h] | 1.6 | 1.5 |
| Temperature | [° C.] | 80 | 80 |
| Pressure | [bar] | 13 | 13 |
| $C_2/C_3$ ratio | [mol/kmol] | 562 | 612 |
| $H_2/C_2$ ratio | [mol/kmol] | 0.08 | 0.03 |
| $MFR_{PP}$ | [g/10 min] | 42 | 13.5 |
| XCS | [wt %] | 14 | 15 |
| $C_2/XCS$ | [wt %] | 42 | 44 |
| $C_2$ content | [wt %] | 7.2 | 8.4 |
| split | [wt %] | 15 | 15 |
| MFR ratio ($MFR_{PP}/MFR_{Matrix}$) | | 0.47 | 0.5 |

From Tables 1 and 2 it can be seen that the heterophasic polypropylenes of inventive Example IE1 (HECO IE1) and Comparative Example CE1 (HECO CE1) respectively of Inventive Example IE4 (HECO IE4) and Comparative Example CE2 (HECO CE2) have been produced with the same polymerization conditions except that there has been used a different catalyst.

The final polypropylene compositions were prepared by melt blending the respective heterophasic polypropylenes (HECO) of component (A), the talc as filler component (C) and optionally the elastomer component (B), the additives and the colour masterbatch in order to obtain the inventive polypropylene compositions IE1, IE2, IE3, IE4 respectively the comparative polypropylene compositions CE1, CE2. The compounding has been performed in a co-rotating twin screw extruder with a standard screw design recommended for talc dispersion.

The amounts of the individual components as well as the mechanical and EFO properties of the final polymer compositions of inventive Examples IE1 to IE4 and Comparative Examples CE1 and CE2 are listed in Table 3.

TABLE 3

Properties of Polypropylene Compositions of inventive Examples IE1 to IE4 and comparative Examples CE1, CE2

|  | unit | IE1 | IE2 | IE3 | IE4 | CE1 | CE2 |
|---|---|---|---|---|---|---|---|
| HECO IE1, IE2, IE3, IE4 | wt % | 68.39 | 68.39 | 68.39 | 87.99 | — | — |
| HECO CE1, CE2 | wt % | — | — | — | — | 68.39 | 87.99 |
| Steamic T1CA | wt % | 17 | 17 | 17 | — | 17 | — |
| Jetfine 3CA | wt % | — | — | — | 10 | — | 10 |
| Elastomer Engage 8200 | wt % | 12.5 | 12.5 | 12.5 | — | 12.5 | — |
| Additives total | wt % | 0.61 | 0.61 | 0.61 | 0.61 | 0.61 | 0.61 |
| Songnox 1010 | wt % | 0.15 | 0.15 | 0.15 | 0.15 | 0.15 | 0.15 |
| Kinox-68G | wt % | 0.1 | 0.1 | 0.1 | 0.1 | 0.1 | 0.1 |
| NA11UH | wt % | 0.1 | 0.1 | 0.1 | | 0.1 | |
| Crodamide ER | wt % | 0.1 | 0.1 | 0.1 | 0.1 | 0.1 | 0.1 |
| Hilite 77 G | wt % | 0.08 | 0.08 | 0.08 | 0.08 | 0.08 | 0.08 |
| Sabostab UV119 | wt % | 0.08 | 0.08 | 0.08 | 0.08 | 0.08 | 0.08 |
| Plasblak PE4103 | wt % | 1.5 | 1.5 | 1.5 | 1.5 | 1.5 | 1.5 |
| $MFR_{comp}$ (230; 2.16) | [g/10 min] | 31.1 | 10.7 | 57.8 | 11.8 | 30.1 | 12.2 |
| Fogging | mg | 0.84 | 0.31 | 0.99 | 0.51 | 0.94 | 0.58 |
| Tensile modulus | MPa | 1937 | 1863 | 2005 | 2134 | 1907 | 2036 |
| Tensile strength | MPa | 22.5 | 22.2 | 22.9 | 27.5 | 22.3 | 27.3 |
| Tensile strain at tensile strength | % | 5 | 5.8 | 4.3 | 3.7 | 5.1 | 4.3 |
| Elongation at break | % | 41 | 211 | 13 | 40 | 39 | 42 |
| Charpy ISO1791eA/+23° C. | $kJ/m^2$ | 8.4 | 27.8 | 5.8 | 6.8 | 7.8 | 6.5 |
| Charpy ISO1791 eA/−20° C. | $kJ/m^2$ | 2.7 | 4 | 2.4 | 3.5 | 2.6 | 2.6 |
| VOC | ppm | 253 | 89 | 326 | 93 | 257 | 108 |
| FOG | ppm | 332 | 178 | 488 | 237 | 348 | 231 |
| Scratch resistance | dL | 2.3 | 1.5 | 2.7 | 2.7 | 2.4 | 2.6 |
| Relation/inequation (1) fogging ≤ 0.02 $MFR_{Comp}$ + 0.3 | | ✓ | ✓ | ✓ | ✓ | not met | not met |

As talc filler the commercial products Steamic T1CA and Jetfine 3CA of Imerys have been used.

As elastomer the commercial product Engage 8200 from DOW Chemicals (density=0.87 g/cm$^3$, MFR (190° C.; 2.16 kg)=5 g/10 min) has been used.

Songnox 1010 from Songwon and Kinox 68G (Tris(2,4-di-tert.butylphenyl)phosphite) from HPL Additives limited have been used as antioxidants.

NA11UH is a nucleation agent from Adeka Palmarole.

Crodamide ER is a slip agent from Croda.

Sabostab UV119 from Sabo and Hilite 77G (2,2,6,6-tetramethyl-4-piperidinyl ester of sebacic acid) from HPL Additives limited have been used as UV stabilisers.

As a colour masterbatch Plasblak PE4103 from Cabot Plastics has been used.

From Table 3 it can be seen that the inventive Composition IE1 and comparative Composition CE1 respectively inventive Composition IE4 and comparative Composition CE2 differ mainly with respect to the catalyst which has been used during polymerization of the according heterophasic polypropylenes (HECO), see Tables 1, 2. Thus IE1 and CE1 respectively IE4 and CE2 can be directly compared with regard to their properties. Accordingly it is evident from Table 3 that the inventive Compositions IE1 and IE4 have an improved fogging value over the comparative Compositions CE1 and CE2 while maintaining a good impact/stiffness balance with low scratch resistance and good VOC and FOG values.

Figure 1:
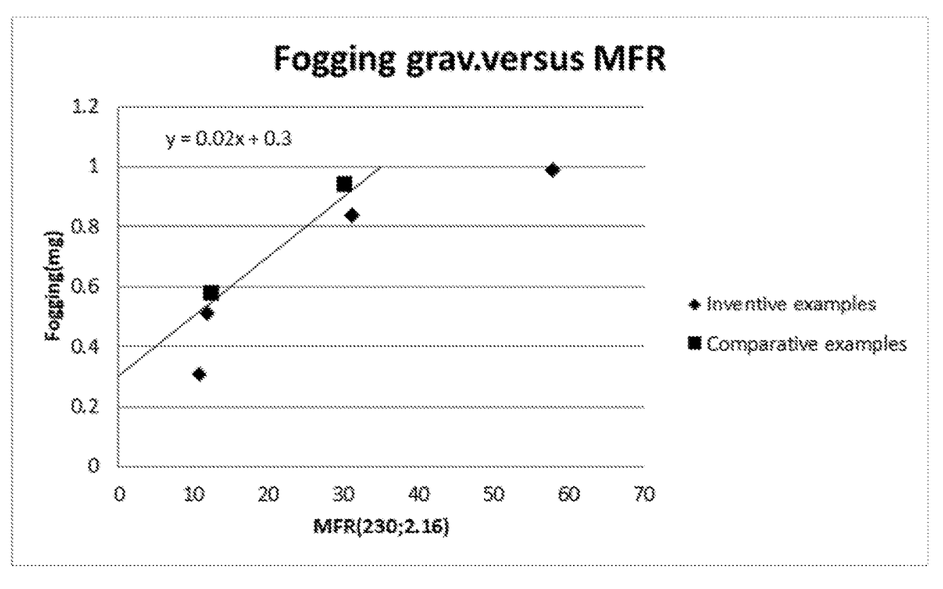
FIG. 1 illustrates fogging (gravimetrically) versus $MFR_{Comp}$ (230; 2.16) of polypropylene compositions of inventive Examples IE1 to IE4 and comparative Examples CE1 and CE2.

Moreover inventive Compositions IE1 to IE4 fulfil inequation (1) which means that the improved fogging performance is achieved over a broad MFR range. This is also apparent from FIG. 1, which shows the fogging values versus the $MFR_{Comp}$ of both the polypropylene compositions of the present invention and the ones of the comparative examples. Whereas the fogging values of the inventive Compositions IE1 to IE4 lie on or beneath the line in FIG. 1 and hence fulfil inequation (1), the values of the comparative Examples CE1 and CE2 are above the line and hence do not fulfil inequation (1).

The invention claimed is:

1. A polypropylene composition comprising:
   (A) 60 to 95 wt % based on the total weight of a final polypropylene composition of a heterophasic polypropylene (HECO) comprising 10 to 30 wt % of dispersed phase based on the total weight of the HECO with the dispersed phase having a comonomer content of 30 to 45 wt % and the HECO having a melt flow rate $MFR_{pp}$ in the range of 12 to 200 g/10 min and being prepared in the presence of a Ziegler Natta catalyst (ZN-C),
   (B) 0 to 15 wt % of one or more elastomers based on the total weight of the final polypropylene composition,
   (C) 5 to 20 wt % of at least one filler based on the total weight of the final polypropylene composition;
   wherein the polypropylene composition fulfils inequation (1)

$$fogging \leq 0.02\ MFR_{comp} + 0.3$$

with the dispersed phase being measured as xylene cold soluble (XCS) fraction at 25° C. according to ISO 16152,
   the comonomer content of the dispersed phase being measured with NMR,
   the $MFR_{comp}$ and the $MFR_{pp}$ being measured at 230° C. and at a load of 2.16 kg according to ISO 1133 and the fogging being measured gravimetrically according to ISO 75201, method B.

2. The polypropylene composition according to claim 1 comprising 5 to 15 wt % of one or more elastomers (B).

3. The polypropylene composition according to claim 1, further comprising up to 5 wt % additives and optionally up to 5 wt % of a colour masterbatch, based on the total weight of the final polypropylene composition.

4. The polypropylene composition according to claim 1, wherein the $MFR_{Comp}$ is in the range of 5 to 90 g/10 min measured at 230° C. and at a load of 2.16 kg according to ISO 1133.

5. The polypropylene composition according to claim 1, wherein the dispersed phase comprises an elastomeric propylene copolymer (EC) with ethylene and/or $C_4$ to $C_{10}$ α-olefins.

6. The polypropylene composition according to claim 1, wherein the heterophasic polypropylene (HECO) has an $MFR_{PP}$ in the range of 12 to 120 g/10 min, measured at 230° C. and at a load of 2.16 kg according to ISO 1133.

7. The polypropylene composition according to claim 1, wherein the xylene cold soluble fraction (XCS) has an intrinsic viscosity (IV) in the range of 1.5 to 6.0 dl/g, measured in Decalin at 135° C. according to DIN ISO 1628/1.

8. The polypropylene composition according to claim 1, wherein the Ziegler Natta catalyst (ZN-C) comprises compounds of a transition metal of Group 4 to 6 of IUPAC, a Group 2 metal compound and an internal donor being a non-phthalic compound.

9. The polypropylene composition according claim 8, wherein said internal donor is selected from the group consisting of malonates, maleates, succinates, citraconates, glutarates, cyclohexene-1,2-dicarboxylates, benzoates and 1,3-diethers, and any derivatives and/or mixtures thereof.

10. The polypropylene composition according to claim 1, wherein the elastomer (B) is an ethylene-higher-α-olefin elastomer with the higher α-olefin having 4 to 12 carbon atoms.

11. The polypropylene composition according to claim 1, wherein the density of the one or more elastomers is below 935 kg/m$^3$.

12. An extruded, blow moulded, or injection moulded article comprising the polypropylene composition of claim 1.

13. An automotive interior article comprising the polypropylene composition of claim 1.

* * * * *